United States Patent
Christopher et al.

(10) Patent No.: US 10,445,282 B2
(45) Date of Patent: Oct. 15, 2019

(54) TECHNIQUES OF PROVIDING SERIAL PORT IN NON-LEGACY SYSTEM VIA EMBEDDED-SYSTEM DEVICE

(71) Applicant: American Megatrends International, LLC, Norcross, GA (US)

(72) Inventors: Samvinesh Christopher, Suwanee, GA (US); Anurag Bhatia, Lilburn, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 59 days.

(21) Appl. No.: 15/225,121

(22) Filed: Aug. 1, 2016

(65) Prior Publication Data
US 2018/0032470 A1 Feb. 1, 2018

(51) Int. Cl.
G06F 13/42 (2006.01)
G06F 13/38 (2006.01)
G06F 13/10 (2006.01)

(52) U.S. Cl.
CPC ........ *G06F 13/4282* (2013.01); *G06F 13/105* (2013.01); *G06F 13/387* (2013.01); *G06F 2213/3852* (2013.01)

(58) Field of Classification Search
None
See application file for complete search history.

(56) References Cited

U.S. PATENT DOCUMENTS

| | | | | |
|---|---|---|---|---|
| 7,966,441 B2 * | 6/2011 | Huang | .................... | H04L 41/08 709/218 |
| 8,069,257 B1 * | 11/2011 | Bhatia | .................... | G06F 13/105 345/501 |
| 8,264,972 B2 * | 9/2012 | Joyner | .................. | H04L 41/145 370/250 |
| 8,510,489 B2 * | 8/2013 | Peng | ...................... | G06F 13/105 710/104 |
| 8,805,983 B2 * | 8/2014 | Dube | ...................... | G06F 15/16 370/463 |
| 8,898,349 B1 * | 11/2014 | Mondal | ................. | G06F 13/385 710/15 |

(Continued)

OTHER PUBLICATIONS

'Intelligent Platform Management Interface Specification—Second Generation v2.0' revision 1.1, Oct. 1, 2013 (full document found at https://www.intel.com/content/dam/www/public/us/en/documents/product-briefs/ipmi-second-gen-interface-spec-v2-rev1-1.pdf).*

(Continued)

*Primary Examiner* — Steven G Snyder
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. The apparatus may be an embedded-system device. The embedded-system device emulates a first serial port. The embedded-system device exposes the first serial port to a host of the embedded-system device through a USB connection. The embedded-system device receives first USB packets containing first command or data from the host through the USB connection. The embedded-system device inputs the first command or data to the first serial port.

11 Claims, 4 Drawing Sheets

(56) References Cited

U.S. PATENT DOCUMENTS

| | | | | |
|---|---|---|---|---|
| 9,779,047 | B2* | 10/2017 | Christopher | G06F 13/362 |
| 9,806,959 | B2* | 10/2017 | Christopher | H04L 41/24 |
| 2008/0005222 | A1* | 1/2008 | Lambert | G06F 3/0227 |
| | | | | 709/203 |
| 2009/0240852 | A1* | 9/2009 | Gou | G06F 13/385 |
| | | | | 710/63 |
| 2009/0296590 | A1* | 12/2009 | Joyner | H04L 41/145 |
| | | | | 370/250 |
| 2011/0093575 | A1* | 4/2011 | Dube | G06F 15/16 |
| | | | | 709/223 |
| 2011/0307639 | A1* | 12/2011 | Dai | H04L 49/70 |
| | | | | 710/106 |
| 2012/0137035 | A1* | 5/2012 | Peng | G06F 13/105 |
| | | | | 710/262 |
| 2017/0039151 | A1* | 2/2017 | Christopher | G06F 13/362 |
| 2017/0293347 | A1* | 10/2017 | Wood, III | G06F 1/3287 |

OTHER PUBLICATIONS

'Intel Low Pin Count (LPC) Interface Specification' revision 1.1, Aug. 2002 (full document can be found at https://www.intel.com/content/dam/www/program/design/us/en/documents/low-pin-count-interface-specification.pdf).*

'FPGA Implementation of RS232 to Universal serial bus converter' by Vijaya et al., 2011 IEEE Symposium on Computers & Informatics.*

'USB CDC Class as Virtual Serial Port' Application Note: AN00124, by XMOS, Jan. 8, 2016. (Year: 2016).*

'Universal Serial Bus Class Definitions for Communication Devices' Version 1.1 Jan. 19, 1999. (Year: 1999).*

* cited by examiner

TECHNIQUES OF PROVIDING SERIAL PORT IN NON-LEGACY SYSTEM VIA EMBEDDED-SYSTEM DEVICE

BACKGROUND

Field

The present disclosure relates generally to embedded-system devices, and more particularly, to techniques of providing a serial port over Universal Serial Bus (USB) at an embedded-system device for use of a host computer.

Background

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device.

Legacy serial ports become obsolete and are removed in legacy free X86 architecture and other CPU architectures like ARM, POWERPC etc. However, Serial Over LAN (SOL) communication is one of the important methods of obtaining information during booting of the host system. SOL is also used to communicate to operating systems (OS) such as UNIX and WINDOWS PE environment. Further, IPMI communication uses different types of interfaces such as a serial interface, a local area network (LAN) interface, an Intelligent Platform Management Bus (IPMB) interface, etc. Without SOL and serial interfaces, IPMI functionality may be limited.

Even though legacy serial ports are eliminated for non-legacy systems, there are still peripherals and devices (e.g., modems and dumb terminals) which use serial communication. Hence, there is still a need for providing a serial interface in a non-legacy system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device emulates a first serial port. The embedded-system device exposes the first serial port to a host of the embedded-system device through a USB connection. The embedded-system device receives first USB packets containing first command or data from the host through the USB connection. The embedded-system device inputs the first command or data to the first serial port.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
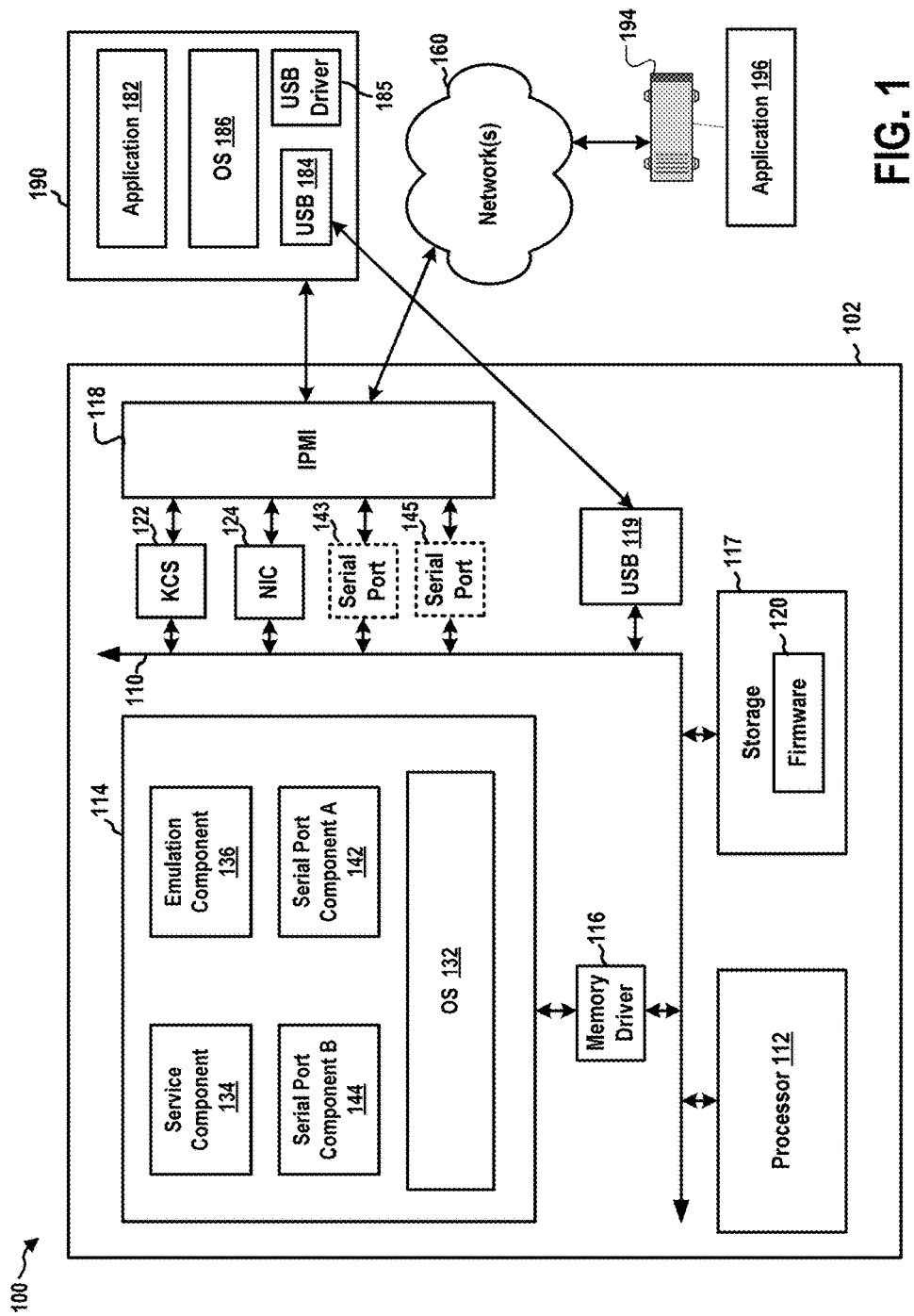
FIG. 1 is a diagram illustrating an embedded-system device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Legacy serial ports become obsolete and are removed in legacy free X86 architecture and other CPU architectures like ARM, POWERPC etc. However, Serial Over LAN (SOL) communication is one of the important methods of obtaining information during booting of the host system. SOL is also used to communicate to operating systems (OSes) such as UNIX and WINDOWS PE environment. Further, IPMI communication uses different types of interfaces such as a serial interface, a local area network (LAN) interface, an Intelligent Platform Management Bus (IPMB) interface, etc. Without SOL and serial interfaces, IPMI functionality may be limited.

Even though legacy serial ports are eliminated for non-legacy systems, there are still peripherals and devices (e.g., modems and dumb terminals) which use serial communication. Hence, there is still a need for providing a serial interface in a non-legacy system.

USB has become popular due to its generic (non-architecture-specific) interface and well defined specifications. This leads to vast adaptation on almost every system from servers to micro-controllers. Most BMCs have one or more USB connections to its host for various purposes (e.g., KVM redirection). With the advent of USB, some legacy devices are implemented as USB class devices. For example, keyboards and mice may be implemented as Human Interface Device (HID) class devices. Legacy serial ports may be implemented as USB communications device class (USB CDC) devices.

As described infra, a BMC may implement the CDC protocol. Thus, the BMC can expose multiple serial ports to its host. The host USB driver can present the CDC devices as legacy serial ports to the host OS. As such, the host OS can communicate with the USB CDC devices as if they are physical serial ports.

FIG. 1 is a diagram 100 illustrating a BMC 102. The BMC 102 has, among other components, a processor 112, a memory 114, a memory driver 116, a USB connection component 119, a storage 117, a keyboard controller style (KCS) interface 122, and a network interface card 124. Further, the BMC 102 may support IPMI and may provide an IPMI interface 118. The IPMI interface 118 may be implemented over the KCS interface 122, the network interface card 124, and other communication interfaces. The memory 114, the processor 112, the memory driver 116, the storage 117, the USB connection component 119, the KCS interface 122, the network interface card 124, etc., may be in communication with each other through a communication channel 110 such as a bus architecture. The BMC 102 may be in communication with, e.g., through communication interfaces or the IPMI interface 118, a host computer 190 and/or a network device 194. The communication between the BMC and the network device 194 may be carried over a network 160. The BMC may manage the host computer 190. The host computer 190 has a USB connection component 184. The BMC 102 may be in communication with the host computer 190 through the USB connection component 119 and the USB connection component 184. In certain configurations, as described infra, the BMC 102 may emulate one or more USB devices. As such, from the perspective of the host computer 190, the host computer 190 may perceive that the one or more USB devices are connected to the host computer 190 through the USB connection component 184.

The storage 117 of the BMC 102 may store BMC firmware 120. When the processor 112 executes the BMC firmware 120, the processor 112 loads code and data of the BMC firmware 120 into the memory 114. This example shows that the BMC firmware 120 provides in the memory 114, among other components, an OS 132, a service component 134, and an emulation component 136. Further, the emulation component 136 may emulate one or more USB devices connected to the USB connection component 119. For example, the emulation component 136 may emulate a CD drive, a flash drive, a hard drive, etc. connected to the USB connection component 119. In this example, the emulation component 136 may also construct a serial port component 142 and a serial port component 144, which emulate a serial port 143 and a serial port 145, respectively. Further, the serial ports 143, 145 are emulated as USB communications device class (USB CDC) devices in communication with the USB connection component 119. As such, the serial ports 143, 145 can communicate with a USB host through the USB connection component 119.

The host computer 190 may detect the serial ports 143, 145 (which are emulated by the BMC 102) as USB devices (particularly CDC devices) connected to the USB connection component 184. In particular, a host OS 186 of the host computer 190 may use a USB driver 185 to communicate with the serial ports 143, 145 through the USB connection component 184. The USB driver 185, recognizing that the serial ports 143, 145 are CDC devices, presents the serial ports 143, 145 to the OS 132 as physical serial ports. Accordingly, the host OS 186 uses the serial ports 143, 145 as if they are physical serial ports.

In a first example, the host computer 190 may have a serial port communication application 182 (e.g., PuTTY) that can communicate through a serial port. In particular, the serial port communication application 182 may write commands and/or data to the serial port 143 (or the serial port 145) via the USB connection component 184, expecting that a device connected to the other side of the serial port 143 would be able to process the commands and/or data. The serial port communication application 182 may also monitor the serial port 143 via the USB connection component 184, expecting to receive commands and/or data from the serial port 143.

More specifically, the serial port communication application 182 may ask the host OS 186 to output commands and/or data through the serial port 143. The host OS 186, in turn, sends the commands and/or data to the USB driver 185. The USB driver 185 packs the commands and/or data into USB packets destined for the emulated serial port 143, which is recognized by the USB driver 185 as a CDC device. Subsequently, the USB driver 185 sends the USB packets to the USB connection component 184, which transmits the USB packets to the USB connection component 119 of the BMC 102 over a communication link.

The USB connection component 119 accordingly receives the USB packets and sends the received packets to the serial port component 142, as those USB packets are destined for the serial port 143 emulated by the serial port component 142. Further, the serial port components 142, 144 may present to the OS 132 the emulated serial ports 143, 145 as physical serial ports. Thus, the serial ports 143, 145 are accessible through appropriate serial port drivers (e.g., provided by the OS 132).

In this example, the service component 134 is configured to communicate with another device through a serial port. In particular, the service component 134 may be configured to utilize the serial port 143, recognizing the serial port 143 as a physical serial port.

The service component 134 may use a serial port driver (e.g., provided by the OS 132) to directly communicate with the serial port 143. After the serial port component 142 receives USB packets from the USB connection component 119, the serial port component 142 extracts the commands and/or data contained in the USB packets. The serial port component 142 then sends to the serial port driver the extracted commands and/or data as commands and/or data that are received from the serial port 143. The service component 134 will accordingly receive, through the serial port driver, those commands and/or data. The service component 134 processes the commands and/or data.

In certain configurations, the service component 134 may generate response commands and/or data. The service component 134 then uses the serial port driver to output the response commands and/or data through the serial port 143. That is, the serial port driver sends the response commands and/or data to the serial port 143 for outputting. The serial port component 142 accordingly receives the response commands and/or data. Subsequently, the serial port component 142 packs the response commands and/or data into USB packets and, then, sends those USB packets as originated from the serial port 143 (a CDC device) to the USB connection component 119. The USB connection component 119 sends the USB packets to the USB connection component 184. The USB driver 185 obtains the USB packets from the USB connection component 184 and extracts the response commands and/or data from the USB packets. The USB driver 185 then sends the response commands and/or data to the serial port communication application 182 as if those commands and/or data are received from the serial port 143, which the serial port communication application 182 recognizes as a physical serial port. The serial port communication application 182 then accordingly processes the response commands and/or data.

As a first example, the service component 134 executed on the BMC 102 may be a debugging program that takes inputs from a serial port. The serial port communication application 182 may send commands and/or data directed to the service component 134 through the serial port 143. Thus, the serial port communication application 182 (e.g., PuTTY or another terminal console) can send input to the service component 134 (e.g., the debugging program) through the serial port 143 emulated by the BMC 102 and, also, can receive output from the service component 134 through the serial port 143.

In a second example, the serial port communication application 182 may be an IPMI application. The IPMI interface 118 are also implemented over the serial ports 143, 145. Accordingly, the serial port communication application 182 may communicate with the BMC 102 in accordance with IPMI standards over the serial ports 143, 145.

In a third example, the network device 194 may have an application 196. In particular, the application 196 may support Serial Over LAN (SOL) functions. Further, the service component 134 may also support SOL functions. The application 196 may be in communication with the service component 134 through the network interface card 124. The service component 134 receives commands and/or data from the host computer 190 through the serial port 143 and/or the serial port 145 and, then, sends the commands and/or data to the application 196 over the network 160. The service component 134 may also receive commands and/or data from the application 196 over the network 160 and, then, sends the commands and/or data to the host computer 190 through the serial port 143 and/or the serial port 145.

Figure 2:
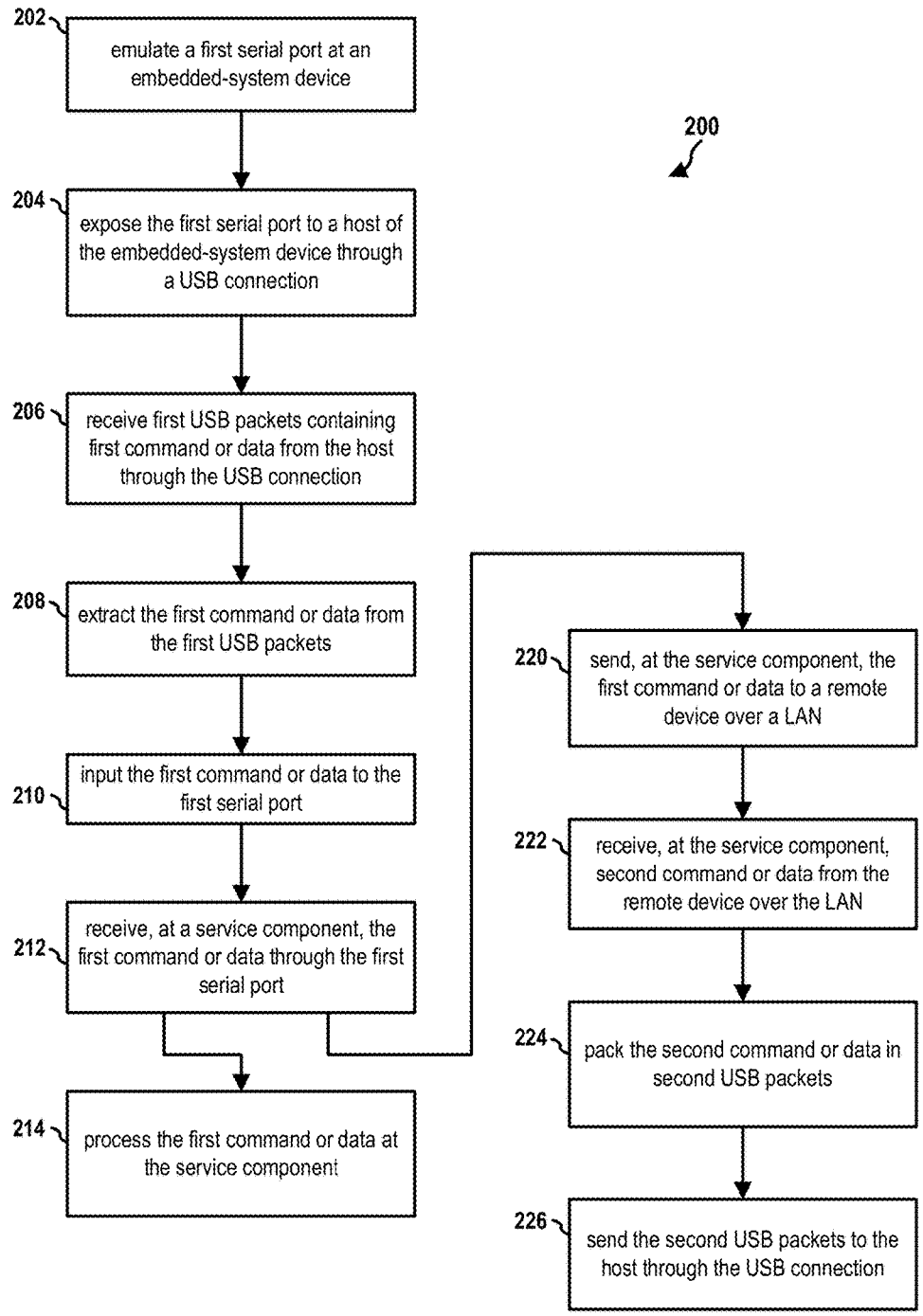
FIG. 2 is a flow chart of a method (process) for communicating through an emulated serial port.

FIG. 2 is a flow chart 200 of a method (process) for communicating through an emulated serial port. The method may be performed by an embedded-system device (e.g., the BMC 102 and the apparatus 102'). At operation 202, the embedded-system device (e.g., via the emulation component 136) emulates a first serial port (e.g., the serial port 143). At operation 204, the embedded-system device exposes the first serial port to a host (e.g., the host computer 190) of the embedded-system device through a USB connection (e.g., the USB connection component 119 and/or the USB connection component 184). At operation 206, the embedded-system device receives first USB packets containing first command or data from the host through the USB connection. At operation 208, the embedded-system device extracts the first command or data from the first USB packets. At operation 210, the embedded-system device inputs the first command or data to the first serial port.

The embedded-system device further includes a service component (e.g., the service component 134). At operation 212, the service component receives the first command or data through the first serial port. In certain configurations, the first command or data is in a format recognizable by the service component. At operation 214, the service component processes the first command or data.

In certain configurations, at operation 220, the service component sends the first command or data to a remote device (e.g., the network device 194) over a LAN (e.g., the network 160). At operation 222, the service component receives the second command or data from the remote device over the LAN. At operation 224, the embedded-system device packs the second command or data in second USB packets. At operation 226, the embedded-system device sends the second USB packets to the host through the USB connection.

Figure 3:
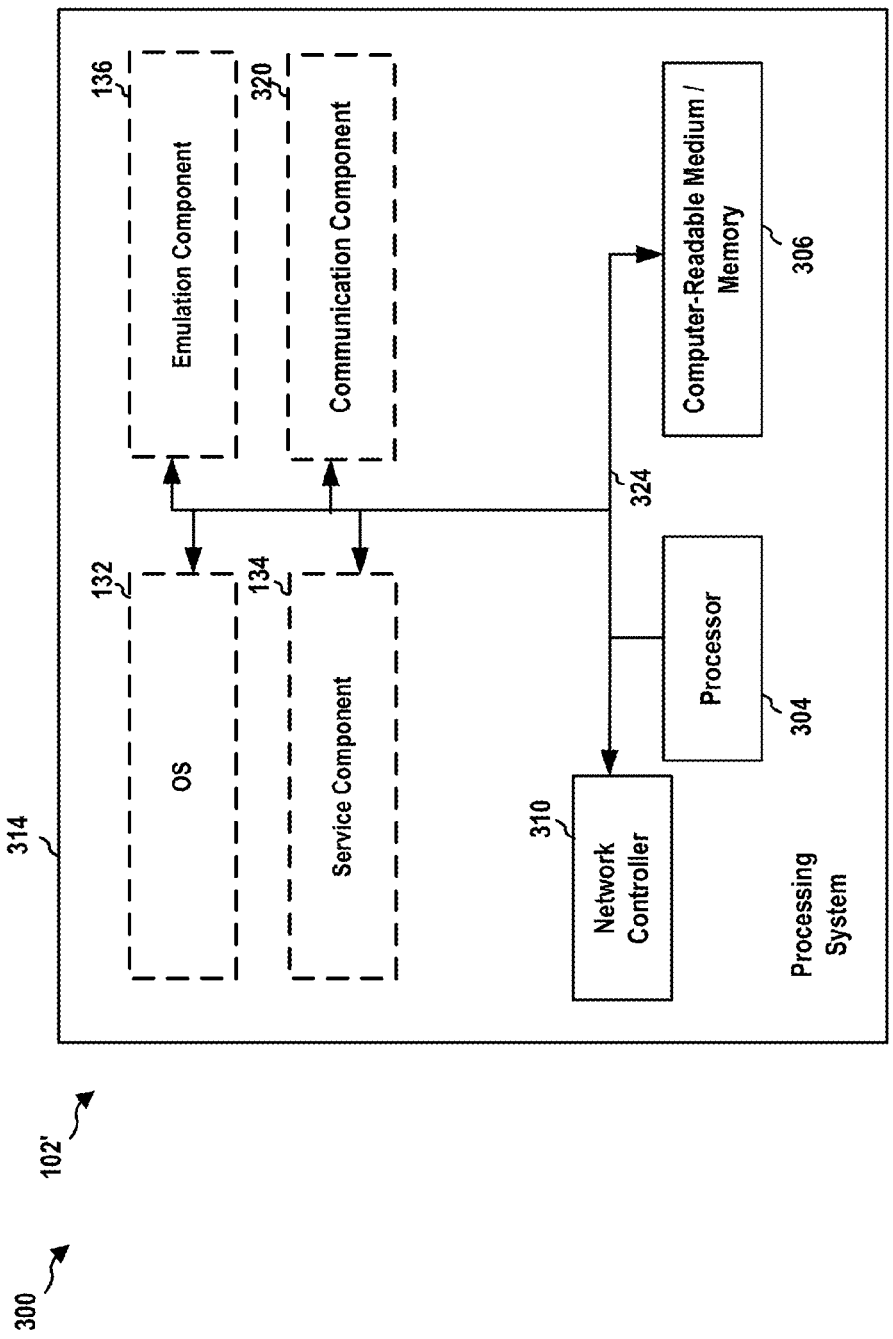
FIG. 3 is a diagram illustrating an example of a hardware implementation for an apparatus employing a processing system.

FIG. 3 is a diagram 300 illustrating an example of a hardware implementation for an apparatus 102' employing a processing system 314. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by the processor 304, the OS 132, the emulation component 136, the service component 134, and the computer-readable medium/memory 306. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the OS 132, the emulation component 136, the service component 134. The components may be software components running in the processor 304, resident/stored in the computer readable medium/memory 306, one or more hardware components coupled to the processor 304, or some combination thereof.

The apparatus 102' may be configured to include means for performing each of the operations described supra referring to FIG. 2. The aforementioned means may be one or more of the aforementioned components of the apparatus 102' and/or the processing system 314 of the apparatus 102' configured to perform the functions recited by the aforementioned means.

Figure 4:
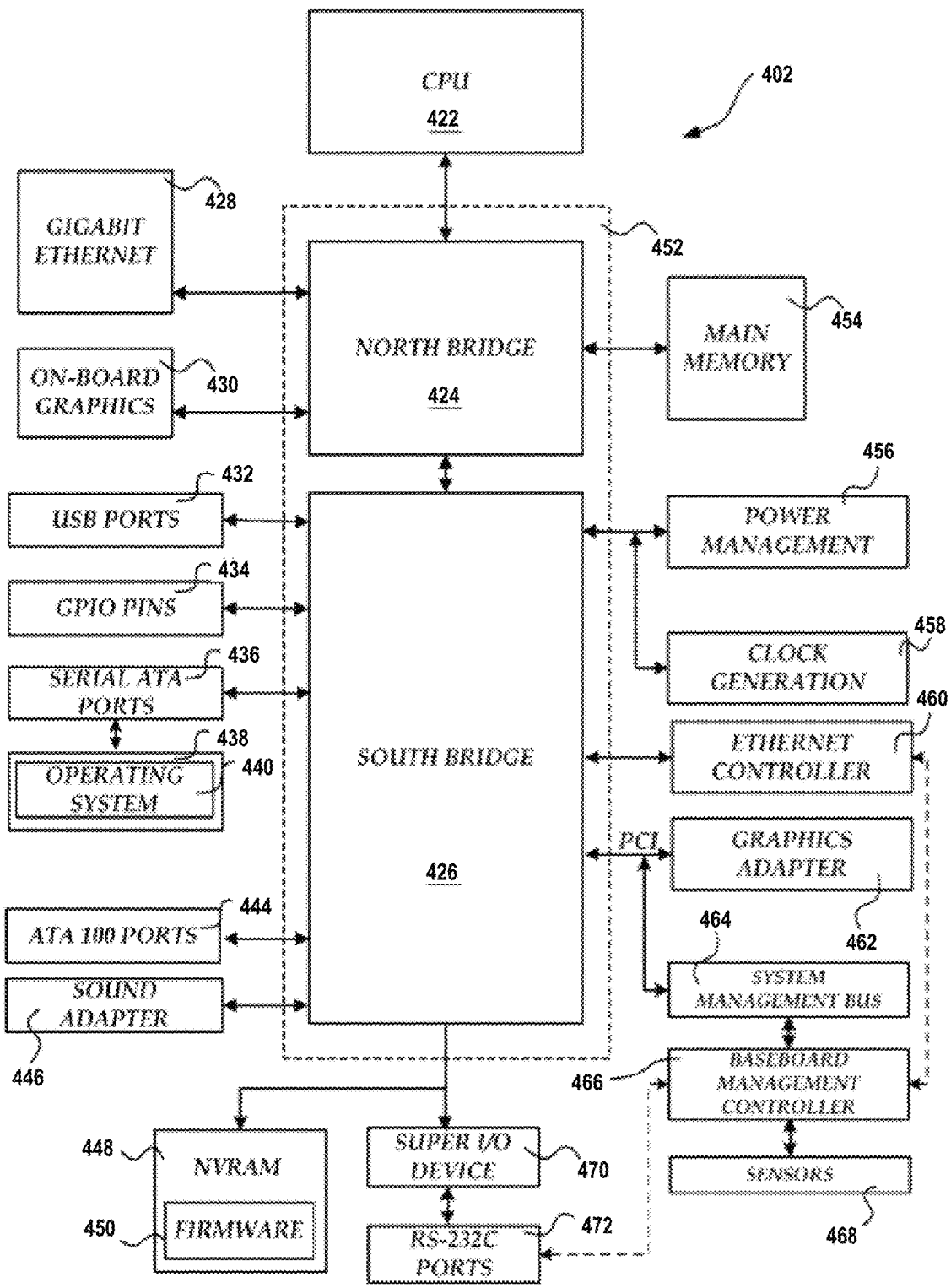
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 190, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating an embedded-system device, comprising:
    emulating a first serial port at the embedded-system device having a processor and a memory coupled to the processor;
    exposing the first serial port to a host of the embedded-system device through a Universal Serial Bus (USB) connection over a communication link between the embedded-system device and the host, wherein the host detects, in accordance with USB standards, the first serial port as a USB communications device class (USB CDC) device at the embedded-system device and connected to the host through the USB connection, wherein the host recognizes the first serial port and operates to generate first command or data to be sent to the first serial port, wherein a USB component at the host packs the first command or data in first USB packets and sends the first USB packets to the embedded-system device through the USB connection, wherein the first command or data are serial command or data;

receiving, at the embedded-system device, the first USB packets containing the first command or data from the host through the USB connection;

determining that the first command or data are directed to the first serial port based on an indication in the first USB packets;

extracting the first command or data from the first USB packets;

sending the first command or data to a service component of the embedded-system device;

receiving, at the service component through a network interface card of the embedded-system device, second command or data in a serial form from a remote device over a local area network (LAN); and sending the second command or data from the service component of the embedded-system device to the host through the first serial port.

2. The method of claim 1, further comprising receiving, at the service component, the first command or data through the first serial port.

3. The method of claim 2, wherein the first command or data is in a format recognizable by the service component, the method further comprising processing the first command or data at the service component.

4. The method of claim 1, wherein the sending the second command or data further comprises:
packing the second command or data in second USB packets; and
sending the second USB packets to the host through the USB connection.

5. An apparatus, the apparatus being an embedded-system device, comprising:
a memory; and
at least one processor coupled to the memory and configured to:
emulate a first serial port at the embedded-system device;
expose the first serial port to a host of the embedded-system device through a Universal Serial Bus (USB) connection over a communication link between the embedded-system device and the host, wherein the host detects, in accordance with USB standards, the first serial port as a USB communications device class (USB CDC) device at the embedded-system device and connected to the host through the USB connection, wherein the host recognizes the first serial port and operates to generate first command or data to be sent to the first serial port, wherein a USB component at the host packs the first command or data in first USB packets and sends the first USB packets to the embedded-system device through the USB connection, wherein the first command or data are serial command or data;
receive, at the embedded-system device, the first USB packets containing first command or data from the host through the USB connection;

determine that the first command or data are directed to the first serial port based on an indication in the first USB packets;
extract the first command or data from the first USB packets;
send the first command or data to a service component of the embedded-system device;
receive, at the service component through a network interface card of the embedded-system device, second command or data in a serial form from a remote device over a local area network (LAN); and
send the second command or data from the service component of the embedded-system device to the host through the first serial port.

6. The apparatus of claim 5, wherein the at least one processor is further configured to receive, at the service component, the first command or data through the first serial port.

7. The apparatus of claim 6, wherein the first command or data is in a format recognizable by the service component, wherein the at least one processor is further configured to process the first command or data at the service component.

8. The apparatus of claim 5, wherein to send the second command or data, the at least one processor is further configured to:
pack the second command or data in second USB packets; and
send the second USB packets to the host through the USB connection.

9. A non-transitory computer-readable medium storing computer executable code for operating an embedded-system device, comprising code to:
emulate a first serial port at the embedded-system device;
expose the first serial port to a host of the embedded-system device through a Universal Serial Bus (USB) connection over a communication link between the embedded-system device and the host, wherein the host detects, in accordance with USB standards, the first serial port as a USB communications device class (USB CDC) device at the embedded-system device and connected to the host through the USB connection, wherein the host recognizes the first serial port and operates to generate first command or data to be sent to the first serial port, wherein a USB component at the host packs the first command or data in first USB packets and sends the first USB packets to the embedded-system device through the USB connection, wherein the first command or data are serial command or data;
receive, at the embedded-system device, the first USB packets containing first command or data from the host through the USB connection;
convert the first USB packets containing the first command or data to serial data containing the first command or data, the serial data being transportable through the first serial port;
input the serial data to the first serial port; and
determine that the first command or data are directed to the first serial port based on an indication in the first USB packets;
extract the first command or data from the first USB packets;
send the first command or data to a service component of the embedded-system device, the serial data through the first serial port;
receive, at the service component through a network interface card of the embedded-system device, second command or data in a serial form from a remote device over a local area network (LAN); and send the second command or data from the service component of the embedded-system device to the host through the first serial port.

10. The non-transitory computer-readable medium of claim 9, wherein the code is further configured to receive, at the service component, the first command or data through the first serial port.

11. The non-transitory computer-readable medium of claim 10, wherein the first command or data is in a format recognizable by the service component, wherein the code is further configured to process the first command or data at the service component.

* * * * *